United States Patent
Zhang et al.

(10) Patent No.: US 10,466,691 B2
(45) Date of Patent: Nov. 5, 2019

(54) COORDINATED CONTROL OF SELF-DRIVING VEHICLES UNDER EMERGENCY SITUATIONS

(71) Applicant: Pony.ai, Inc., Fremont, CA (US)

(72) Inventors: Zhuo Zhang, Fremont, CA (US); Sinan Xiao, Fremont, CA (US); Xiang Yu, Santa Clara, CA (US); Hao Song, Sunnyvale, CA (US); Tianyi Li, San Jose, CA (US); Bo Xiao, San Jose, CA (US); Jie Hou, San Francisco, CA (US); Yiming Liu, San Jose, CA (US); Tiancheng Lou, Milpitas, CA (US); Jun Peng, Fremont, CA (US)

(73) Assignee: PONY AI INC., Cayman Islands (KY)

( * ) Notice: Subject to any disclaimer, the term of this patent is extended or adjusted under 35 U.S.C. 154(b) by 83 days.

(21) Appl. No.: 15/804,187

(22) Filed: Nov. 6, 2017

(65) Prior Publication Data

US 2019/0137996 A1    May 9, 2019

(51) Int. Cl.
G05D 1/00 (2006.01)
G05D 1/02 (2006.01)

(52) U.S. Cl.
CPC ......... G05D 1/0027 (2013.01); G05D 1/0088 (2013.01); G05D 1/0246 (2013.01)

(58) Field of Classification Search
CPC ... G05D 1/0027; G05D 1/0088; G05D 1/0246
USPC ......................................................... 701/27
See application file for complete search history.

(56) References Cited

U.S. PATENT DOCUMENTS

| | | | |
|---|---|---|---|
| 8,983,682 B1 | 3/2015 | Peeters et al. | |
| 2005/0073436 A1* | 4/2005 | Negreiro | G08G 1/017 340/937 |
| 2006/0195079 A1 | 8/2006 | Eberl | |
| 2012/0083969 A1* | 4/2012 | Greiner | G06Q 10/047 701/31.4 |
| 2012/0256769 A1 | 10/2012 | Satpathy | |
| 2014/0136045 A1* | 5/2014 | Zhu | G01S 17/936 701/23 |
| 2015/0179062 A1* | 6/2015 | Ralston | G01C 21/26 701/117 |
| 2016/0358080 A1* | 12/2016 | Blanco | G08B 15/007 |
| 2018/0018869 A1* | 1/2018 | Ahmad | G08G 1/205 |
| 2018/0025636 A1* | 1/2018 | Boykin | G11B 27/102 701/1 |
| 2018/0074513 A9* | 3/2018 | Harvey | G05D 1/0297 |
| 2018/0165959 A1* | 6/2018 | Leem | B60W 40/10 |

(Continued)

*Primary Examiner* — Marthe Y Marc-Coleman
(74) *Attorney, Agent, or Firm* — Sheppard Mullin Richter & Hampton LLP

(57) ABSTRACT

A system included and a computer-implemented method performed in one of a plurality of self-driving vehicles that are connected through a network are described. The system performs: processing image data of one or more scene images received by said one of the plurality of self-driving vehicles, to detect one or more objects included in the one or more scene images; determining a target object from the one or more detected objects at least based on the processed image data; predicting movement of the target object at least based on a current position and a current movement state of the target object; and performing a self-driving operation to drive said one of the plurality of self-driving vehicles based on the predicted movement of the target object.

20 Claims, 9 Drawing Sheets

(56) References Cited

U.S. PATENT DOCUMENTS

2019/0035269 A1* 1/2019 Donovan ............. G05D 1/0055
2019/0051188 A1* 2/2019 Moustafa ................ G08G 1/22
2019/0072969 A1* 3/2019 Han ....................... G01C 21/26

* cited by examiner

COORDINATED CONTROL OF SELF-DRIVING VEHICLES UNDER EMERGENCY SITUATIONS

BACKGROUND

Self-driving vehicles such as vehicles that autonomously operate with limited human inputs or without human inputs are expected in various fields. Since such a self-driving vehicle autonomously operates driving thereof, drivers, if any, can focus more on other intended purposes while riding on the vehicles. When no driver or passenger is on the self-driving vehicle, the self-driving vehicle may be able to perform more aggressive operations, such as in an emergency situation.

In particular, self-driving vehicles that are intended to handle an emergency situation are expected to efficiently handle the emergency situation while minimizing risk to the public and personnel deployed to handle the emergency situation. For example, a self-driving vehicle may need to destruct a matter causing the emergency situation away from the public, or may need to evacuate the public away from the matter. In another example, a self-driving vehicle may need to settle the emergency situation as quickly as possible to avoid danger to the public. Therefore, self-driving vehicles intended to handle an emergency situation may be required to perform functions other than simply driving from a start location to a destination as efficiently and safely as possible, which may be required for ordinary self-driving vehicles.

These and other issues are addressed, resolved, and/or reduced using techniques described herein. The foregoing examples of the related art and limitations related therewith are intended to be illustrative and not exclusive. Other limitations of the related art will become apparent to those of skill in the relevant art upon a reading of the specification and a study of the drawings.

SUMMARY

Described herein are a system included in and a computer-implemented method performed in one of a plurality of self-driving vehicles that are connected through a network. The system includes one or more processors; and a memory storing instructions that, when executed by the one or more processors.

In one embodiment, the disclosure describes a system that performs: processing image data of one or more scene images received by said one of the plurality of self-driving vehicles, to detect one or more objects included in the one or more scene images; determining a target object from the one or more detected objects at least based on the processed image data; predicting movement of the target object at least based on a current position and a current movement state of the target object; and performing a self-driving operation to drive said one of the plurality of self-driving vehicles based on the predicted movement of the target object.

In some embodiments, the determining the target object comprises: receiving a feature of the target object from an external source that is external to said one of the plurality of self-driving vehicles; and comparing the received feature of the target object with a corresponding feature of one or more of the detected objects that are obtained from the processed image data.

In some embodiments, the determining the target object comprises: determining whether or not movement of a selected one of the detected objects matches a predetermined standard; and upon determining that the movement of the selected one of the detected objects matches the predetermined standard, determining the selected one of the detected objects as the target object.

In some embodiments, the determining the target object comprises: determining whether or not movement of a selected one of the detected objects does not match a predetermined standard; and upon determining that the movement of the selected one of the detected objects does not match the predetermined standard, determining the selected one of the detected objects as the target object.

In some embodiments, the current movement state of the target object includes a direction of movement of the target object, an orientation of the target object, and a speed of the movement of the target object.

In some embodiments, the self-driving operation includes causing said one of the plurality of self-driving vehicles to pursue the target object. In some embodiments, the self-driving operation includes causing said one of the plurality of self-driving vehicles to attack the target object.

In some embodiments, the system is caused to further perform communication with another one of the plurality of self-driving vehicles through the network, based on the predicted movement of the target object. In some embodiments, the communication includes sending an instruction to take a designated route to said another one of the plurality of self-driving vehicles. In some embodiments, the communication includes sending an instruction to proceed to a designated location to said another one of the plurality of self-driving vehicles.

In some embodiments, the system is caused to further perform communication with a traffic signal system to cause one or more traffic signals to be at a designated state.

In some embodiments, the system is caused to further perform generating an on-site notification from said one of the plurality of self-driving vehicles, based on the predicted movement of the target object.

In some embodiments, the system is caused to further perform updating the predicted movement of the target object, based on the self-driving operation that has been performed.

In one embodiment, the disclosure describes a computer-implemented method performed in one of a plurality of self-driving vehicles that are connected through a network. The method comprises: processing image data of one or more scene images received by said one of the plurality of self-driving vehicles, to detect one or more objects included in the one or more scene images; determining a target object from the one or more detected objects at least based on the processed image data; predicting movement of the target object at least based on a current position and a current movement state of the target object; and performing a self-driving operation to drive said one of the plurality of self-driving vehicles based on the predicted movement of the target object.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
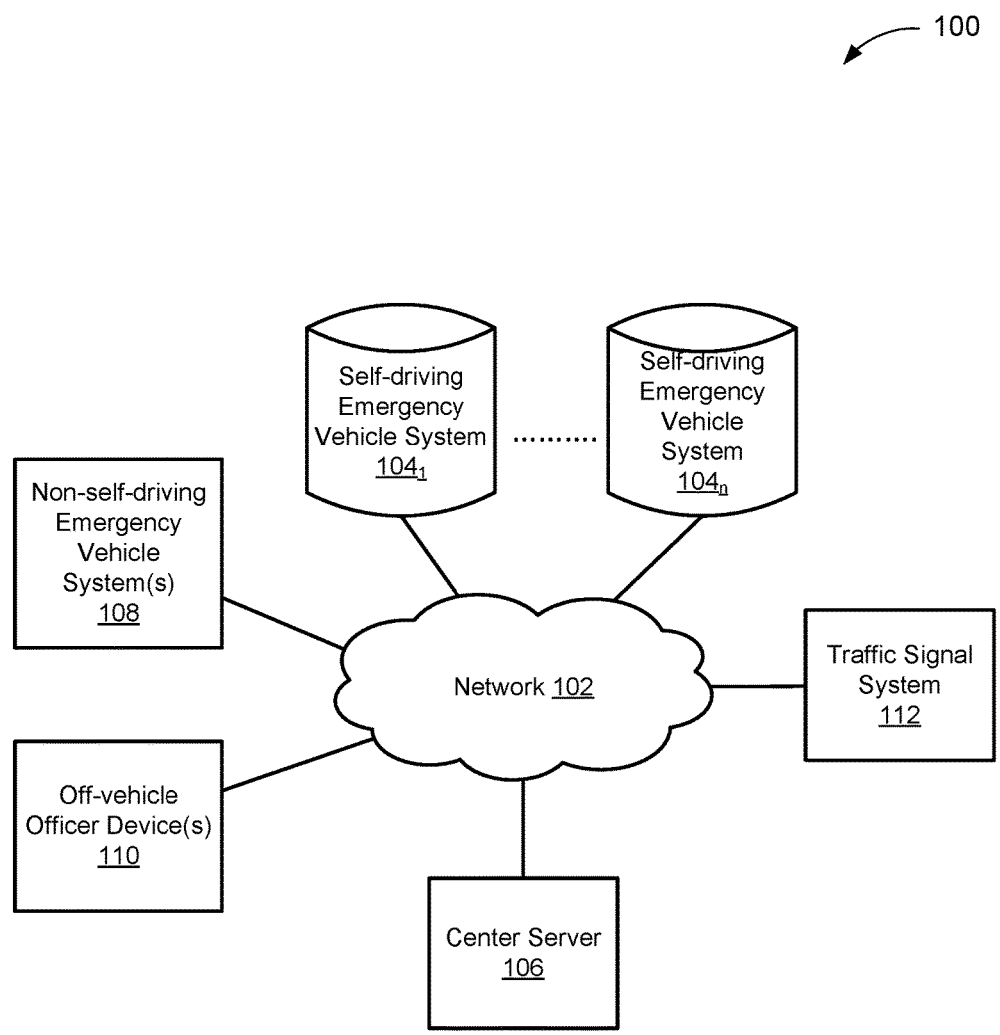
FIG. 1 is a schematic diagram depicting an example of a self-driving-vehicle-based emergency system that includes a plurality of self-driving emergency vehicles according to an embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a system included in one of a plurality of self-driving vehicles that are connected through a network and a computer-implemented method performed in one of a plurality of self-driving vehicles that are connected through a network.

In a specific implementation, the system and the computer-implemented method are intended to handle an emergency situation where the self-driving vehicles are deployed to capture a target object that may cause danger to the public (e.g., a police car chase situation). In another specific implementation, the system and the computer-implemented method are intended to handle an emergency situation where the self-driving vehicles are deployed to guide the traffic flow away from a location of the emergency situation (e.g., a traffic accident). In another specific implementation, the system and the computer-implemented method are intended to handle an emergency situation where the self-driving vehicles are deployed to evacuate the public away from a location of the emergency situation (e.g., disaster).

In some implementations, the system performs: processing image data of one or more scene images received or captured by said one of the plurality of self-driving vehicles or by an image-capturing system (e.g., a camera on a drone conducting video surveillance over the area) remotely connected to the system or one or more of the vehicles, to detect one or more objects included in the one or more scene images; determining a target object from the one or more detected objects at least based on the processed image data; predicting movement of the target object at least based on a current position and a current movement state of the target object; and performing a self-driving operation to drive said one of the plurality of self-driving vehicles based on the predicted movement of the target object.

FIG. 1 is a schematic diagram depicting an example of a self-driving-vehicle-based emergency system 100 that includes a plurality of self-driving emergency vehicles according to an embodiment. In the example depicted in FIG. 1, the self-driving-vehicle-based emergency system 100 includes a network 102, a plurality of self-driving emergency vehicle systems 104$_1$-104$_n$, (hereinafter collectively referred to as self-driving emergency vehicle systems 104), a center server 106, non-self-driving emergency vehicle system(s) 108, off-vehicle officer device(s) 110, and a traffic signal system 112. The self-driving emergency vehicle systems 104, the center server 106, the non-self-driving emergency vehicle system(s) 108, the off-vehicle officer device(s) 110, and the traffic signal system 112 are coupled to the network 102.

In the example of FIG. 1, the network 102 is intended to represent a variety of potentially applicable technologies. For example, the network 102 can be used to form a network or part of a network. Where two components are co-located on a device, the network 102 can include a bus or other data conduit or plane. Depending upon implementation-specific or other considerations, the network 102 can include wired communication interfaces and wireless communication interfaces for communicating over wired or wireless communication channels. Where a first component is located on a first device and a second component is located on a second (different) device, the network 102 can include a wireless or wired back-end network or LAN. The network 102 can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the network 102 can include a private cloud under the control of an enterprise or third party, or a public cloud.

In the example of FIG. 1, the self-driving emergency vehicle system 104 is intended to represent an emergency vehicle (e.g., police vehicle, ambulance, fire truck, and etc.) that is capable of sensing its environment and navigating with a limited human input or without human input. The "vehicle" discussed in this paper typically includes a vehicle that drives on the ground, and may also include a vehicle that flies in the sky (e.g., drones, helicopter, airplanes, and so on). The "vehicle" discussed in this paper may or may not accommodate one or more passengers therein.

In one embodiment, the self-driving emergency vehicle system 104 includes a vehicle that controls braking and/or acceleration without real time human input. In another embodiment, the self-driving emergency vehicle system 104 includes a vehicle that controls steering without real time human input based on inputs from one or more lens mount units. In another embodiment, the self-driving emergency vehicle system 104 includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control wheel movement of a non-self-driving vehicle, such as gear shifting, steering control, braking pedal control, accel pedal control, crutch pedal control, and so on.

In the example of FIG. 1, the self-driving emergency vehicle system 104 is capable of sensing its environment based on inputs from one or more imaging devices (e.g., camera) mounted on the self-driving emergency vehicle system 104. In an embodiment, the self-driving emergency vehicle system 104 is configured to analyze image data obtained from the one or more imaging devices and identify objects (e.g., traffic signals, road signs, other vehicles, pedestrians, and obstacles) included in images of the analyzed image data.

In the example of FIG. 1, the self-driving emergency vehicle system 104 is also capable of performing a self-driving operation based on the identified objects. In an embodiment, the self-driving emergency vehicle system 104 is also capable of drive the vehicle so as to follow a traffic stream without hitting the identified objects. For example, the self-driving emergency vehicle system 104 follow traffic signals identified based on image data, follow traffic signs identified based on image data, and drive with a sufficient distance from preceding vehicles.

In the example of FIG. 1, the self-driving emergency vehicle system 104 is also capable of determining a target object among the identified objects based on image data and control the vehicle to follow the target object. In an embodiment, the target object may be a suspect, a suspect's vehicle, an unattended vehicle (e.g., wheeled drones) manipulated by a suspect, an unattended animal, a victim, an injured person, and so on. In an embodiment, the target object may be a disaster-related object, such as flood water, fire, landslides, snow avalanches, a fallen tree, and so on. In an embodiment, the target object may be an object involved in a traffic accident, including a crashed vehicle, a stalled vehicle, debris of crash, and so on. For example, the self-driving emergency vehicle system 104 identifies a license plate of a vehicle as a target object and controls the vehicle so as to follow the license plate. In another example, the self-driving emergency vehicle system 104 a person of particular features (e.g., male, 6'2", black short hair, brown jackets, and blue jeans) as a target object and controls the vehicle so as to pursue the person of the particular features.

In the example of FIG. 1, the self-driving emergency vehicle system 104 is also capable of communicating with systems or devices connected to the network 102. In an embodiment, the self-driving emergency vehicle system 104 communicates with the center server 106 via the network 102. For example, the self-driving emergency vehicle system 104 pulls up from the center server 106 features and/or attribute information (e.g., appearance of the target, license plate number, and etc.) of the target object. In another example, the self-driving emergency vehicle system 104 receives from the center server 106 a push message, for example, regarding details of a 911 call received from a citizen. In still another example, the self-driving emergency vehicle system 104 periodically notifies information of the self-driving emergency vehicle system 104 such as locations and directions thereof to the center server 106.

In an embodiment, the self-driving emergency vehicle system 104 communicates with one or more other self-driving emergency vehicle systems 104 via the network 102. For example, the self-driving emergency vehicle system 104 sends information of the target object to the one or more other self-driving emergency vehicle systems 104, such that the one or more other self-driving emergency vehicle systems 104 can follow the target object. In another example, the self-driving emergency vehicle system 104 commands one or more other self-driving police emergency systems 104 to proceed to a particular location so as to encompass the target object at the particular location. In still another example, the self-driving emergency vehicle system 104 notifies a route to be taken thereby (or a route that has been taken thereby) to the one or more other self-driving emergency vehicle systems 104.

In an embodiment, the self-driving emergency vehicle system 104 communicates with the non-self-driving police vehicle system(s) 108 and with the off-vehicle police officer device(s) 110 via the network 102 in a manner similar to the communication with the one or more other self-driving emergency vehicle systems 104. For example, the self-driving emergency vehicle system 104 sends information of the target object, information of the route to be taken thereby, information of route taken by the self-driving emergency vehicle system 104, and so on to the non-self-driving police vehicle system(s) 108 and with the off-vehicle police officer device(s) 110. In another example, the self-driving emergency vehicle system 104 receives information about current locations of the non-self-driving police vehicle system(s) 108 and with the off-vehicle police officer device(s) 110 and information of the target object, from the non-self-driving police vehicle system(s) 108 and with the off-vehicle police officer device(s) 110.

In an embodiment, the self-driving emergency vehicle system 104 communicates with the traffic signal system 112 via the network 102. For example, the self-driving emergency vehicle system 104 sends a current location and a route to be taken thereby to the traffic signal system 112, such that traffic signals on the route to be green. In another example, the self-driving emergency vehicle system 104 sends a specific instruction to change traffic signals to the traffic signal system 112. Depending on a specific implementation of the embodiment, the traffic signal system 112 changes signals in response to the instruction, such that a clear (green light) path is provided to the self-driving emergency vehicle system 104, that public vehicles do not go to the direction of the self-driving emergency vehicle system 104 or to the target object, and that the target object are attempted to go to a specific location (e.g., a less populated area, a dead end, and so on).

In the example of FIG. 1, the self-driving emergency vehicle system 104 is also capable of generating messages to people on-site, i.e., at the location of the self-driving emergency vehicle system 104. In an embodiment, the self-driving emergency vehicle system 104 generates an audio message (voice message). For example, the self-driving emergency vehicle system 104 generates an alert voice message to call attention to the public around the self-driving emergency vehicle system 104. In another example, the self-driving emergency vehicle system 104 generates a message (warning message) against a target object to persuade surrender. In another example, the self-driving emergency vehicle system 104 generates an instructive audio message (e.g., police code word) to on-site officer. In another embodiment, the self-driving emergency vehicle system 104 generates a visual message to be displayed on a display, which is, for example, mounted on the self-driving emergency vehicle system 104. The visual message may or may not include the same content as the audio message.

In the example of FIG. 1, the center server 106 is intended to represent a server that is capable of providing information to the self-driving emergency vehicle system 104 and the other elements connected to the network 102. In an embodiment, the information include static information regarding a geographic region (e.g., city map) managed by the center server 106, static information regarding the target object (e.g., crime history, appearance, attribute, and so on), dynamic information regarding the geographic region (e.g., a traffic condition, amounts of pedestrians, etc.), dynamic information regarding the target object (e.g., types of clothes worn thereby, whether or not the target object carries weapon, and whether or not the target object is with a hostage, etc.). In an embodiment, the center server 106 generates the dynamic information based on information collected from one or more of the other elements in the self-driving-vehicle-based emergency system 100 (e.g., the self-driving emergency vehicle systems 104).

In the example of FIG. 1, the non-self-driving emergency vehicle system(s) 108 is intended to represent an emergency vehicle (e.g., police vehicle, ambulance, fire truck, and etc.) that is not capable of navigating with a limited human input or without human input. In an embodiment, the non-self-driving emergency vehicle system(s) 108 include conventional emergency vehicles. In an embodiment, the non-self-driving emergency vehicle system(s) 108 is capable of communicating with one or more of the other elements in the self-driving-vehicle-based emergency system 100 (e.g., the self-driving emergency vehicle systems 104) via the network 102.

In the example of FIG. 1, the off-vehicle officer device(s) 110 is intended to represent a communication device (e.g., a radio transceiver, a mobile phone, etc.) that is carried by an off-vehicle officer. In an embodiment, the off-vehicle officer device(s) 110 is capable of communicating with one or more of the other elements in the self-driving-vehicle-based emergency system 100 (e.g., the self-driving emergency vehicle systems 104) via the network 102.

In the example of FIG. 1, the traffic signal system 112 is intended to represent a group of traffic signals disposed on roads and a control system that controls the traffic signals. In an embodiment, the traffic signal system 112 is capable of causing a traffic signal for a direction at an intersection to be either green or red for a predetermined period of time. In a more specific example, the traffic signal system 112 is capable of causing all traffic signals at an intersection to be red, so as to freeze the traffic flow. In a more specific example, the traffic signal system 112 is capable of causing signals in an area to be green or red, so as to guide a traffic flow in a certain direction (e.g., direction away from an incident area). In an embodiment, the traffic signal system 112 is capable of operating based on commands from the self-driving emergency vehicle systems 104 and/or the center server 106.

In a specific implementation, when the traffic signal system 112 receives contradicting commands for a specific traffic signal from two or more network elements (e.g., two or more the self-driving emergency vehicle systems 104), the traffic signal system 112 may determine a state of the traffic signal on a first-come-first-serve basis or by majority.

Figure 2:
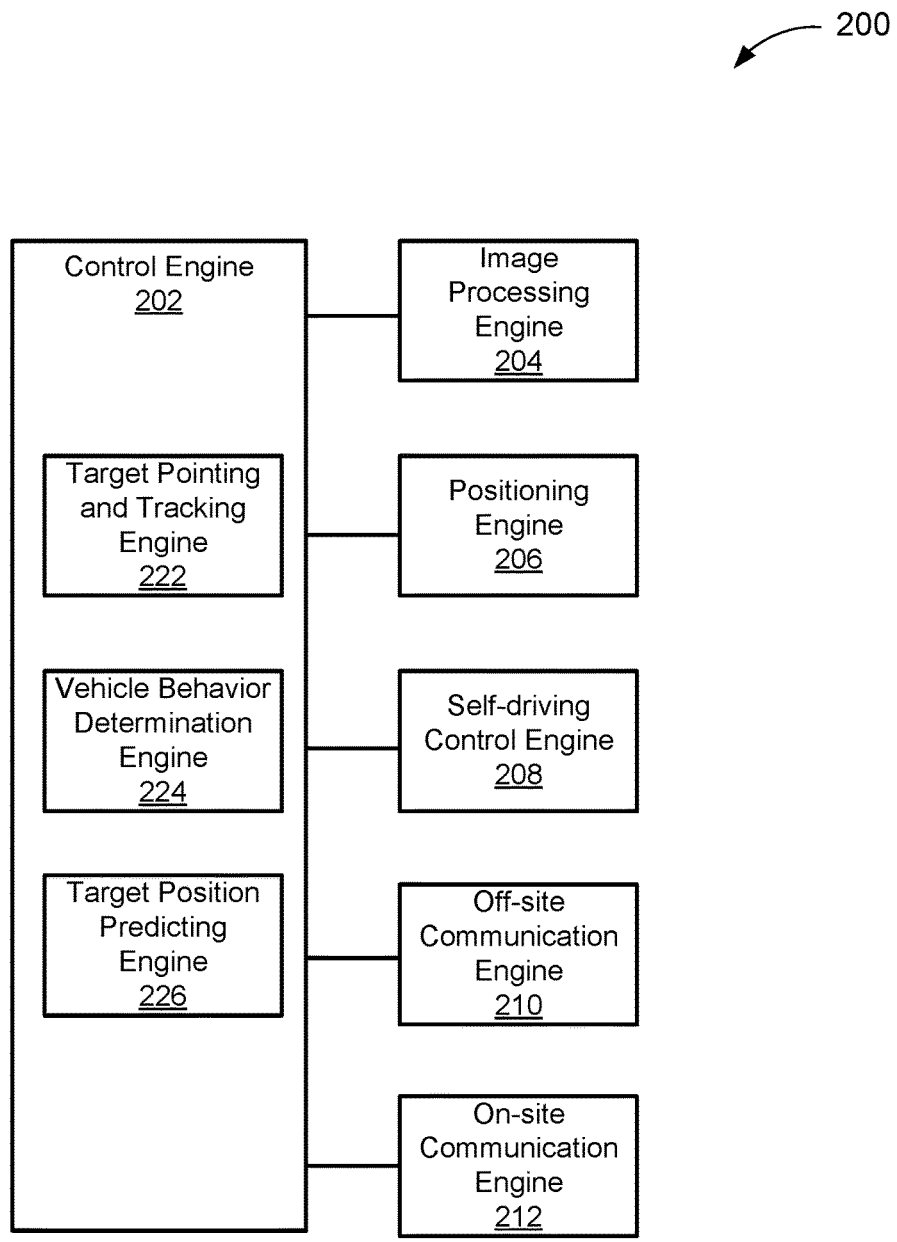
FIG. 2 is a schematic diagram depicting an example of a self-driving emergency vehicle system according to an embodiment.

FIG. 2 is a schematic diagram depicting an example of a self-driving emergency vehicle system 200 according to an embodiment. In an embodiment, the self-driving emergency vehicle system 200 corresponds to the self-driving emergency vehicle system 104 depicted in FIG. 1.

In the example depicted in FIG. 2, the self-driving emergency vehicle system 200 includes a control engine 202, an image processing engine 204, a positioning engine 206, a self-driving control engine 208, an off-site communication engine 210, and an on-site communication engine 212. In the example depicted in FIG. 2, the control engine 202 is coupled to the image processing engine 204, the positioning engine 206, the self-driving control engine 208, the off-site communication engine 210, and the on-site communication engine 212. Further, in the example depicted in FIG. 2, the control engine 202 is intended to represent specifically-purposed hardware and software configured to control overall operation of the self-driving emergency vehicle system 200. The control engine 202 includes a target pointing and tracking engine 222, a vehicle behavior determination engine 224, and a target position predicting engine 226, to achieve specific intended purposes.

In the example depicted in FIG. 2, the image processing engine 204 is intended to represent specifically-purposed hardware and software configured to carry out image processing of image data of scene images generated by imaging devices (not shown) mounted on the self-driving emergency vehicle system 200. In a specific example, the scene images include road signs, traffic signals, lane lines, other vehicles, pedestrians, buildings, and so on. In an embodiment, the image processing engine 204 is configured to detect objects included in each of the scene images. In a specific example, the image processing engine 204 detects objects based on a contour line (high contrast region) included in the scene images.

In an embodiment, the image processing engine 204 is configured to identify each object included in the scene images based on image processing of the image data thereof, in accordance with an image recognition technique. For example, according to an image recognition technique, the image processing engine 204 compares image data of each of the detected objects with image data of reference objects that are stored in advance, for example, in the self-driving emergency vehicle system 200 or at an external server (e.g., the center server 106 in FIG. 1) for identification of the detected objects. For the image recognition, an applicable machine learning technology (including deep learning) is employed in a specific implementation.

In an embodiment, the image processing engine 204 is configured to generate processed image data and provide the processed image data to the control engine 202. For example, the processed image data include the image data obtained from the imaging devices and metadata of identified objects and metadata of detected objects (but not identified). In a more specific example, the metadata include a relative position (including distance) of each detected object from the self-driving emergency vehicle system 200. In another more specific example, the metadata include a model, make, year, and color of each vehicle included in a scene image, a license plate number of each vehicle included in a scene image, a height, predicted gender, predicted age, and clothes of each pedestrian included in a scene image. In another more specific example, the metadata may also include the number of passengers in one or more vehicles included in the scene image.

In the example depicted in FIG. 2, the positioning engine 206 is intended to represent specifically-purposed hardware and software configured to determine absolute position and orientation of the self-driving emergency vehicle system 200 itself and the detected objects. In an embodiment, the positioning engine 206 determines absolute position and orientation of the self-driving emergency vehicle system 200 based on an inputs from sensors, including a global positioning system (GPS), a gyro sensor, an acceleration sensor, and so on. In an embodiment, the positioning engine 206 determines absolute position and orientation of one or more detected objects based on the input from the sensors and the relative position obtained based on the image processing.

In the example depicted in FIG. 2, the target pointing and tracking engine 222 is intended to represent specifically-purposed hardware and software configured to mark a detected object as a target object and track a position of the target object. In an embodiment, the target pointing and tracking engine 222 determines the target object based on local information that is locally obtained from the processed image data. For example, the target pointing and tracking engine 222 determines a detected object as a target object when the detected object (e.g., vehicle) violates a predetermined standard such as a traffic rule (e.g., red light running, speeding, weaving) or when the detected object's movement is likely to match a predetermined standard (e.g., feature of a driving under the influence (DUI)). In an embodiment, the target pointing and tracking engine 222 determines the target object based on external information that is obtained from an external source along with the local information. For example, the target pointing and tracking engine 222 determines a detected object as a target object when a license plate number included in the external information matches a license plate number included in the metadata of the processed image data.

In another embodiment, the target pointing and tracking engine 222 determines a detected object as the target object that has been determined by another self-driving emergency vehicle system, based on information received from said another self-driving emergency vehicle system. For example, the target pointing and tracking engine 222 determines a detected object as the target object, when features of a vehicle and a location of the vehicle that are notified from another self-driving emergency vehicle system match features and a location of a vehicle detected through image processing.

In an embodiment, when another self-driving emergency vehicle system has already pointed a target object, the target pointing and tracking engine 222 may be deactivated, such that the self-driving emergency vehicle system 200 focus on dealing with the target object pointed by another self-driving emergency vehicle system. In another embodiment, when another self-driving emergency vehicle system has already pointed a target object, the target pointing and tracking engine 222 may remain activated, such that another target object can be pointed by the target pointing and tracking engine 222. Depending on a specific implementation (e.g., a probability to capture each of target objects, danger to the public, etc.), a target object to be focused on may be selected.

In the example depicted in FIG. 2, the vehicle behavior determination engine 224 is intended to represent specifically-purposed hardware and software configured to determine behavior of the self-driving emergency vehicle system 200. In an embodiment, the vehicle behavior determination engine 224 autonomously determines behavior of the self-driving emergency vehicle system 200. More specifically, the vehicle behavior determination engine 224 determines to cause the self-driving emergency vehicle system 200 to pursue the target object, proceed to a specific location not pursuing the target object, take a specific route, and stay at the current location, based on values of one or more parameters. Further, the vehicle behavior determination engine 224 determines to perform off-site communication through a network (e.g., the network 102 in FIG. 1) with network elements (e.g., the self-driving emergency vehicle system 104, the center server 106, and the traffic signal system 112 in FIG. 1), based on values of one or more parameters. Moreover, the vehicle behavior determination engine 224 determines to perform on-site communication using output devices (e.g., speaker, display, siren, beacon, and etc.), based on values of one or more parameters.

In an embodiment, the parameters include one or more of a speed of a target object, a distance to the target object, the number (density) of emergency vehicle systems deployed around the target object, time in the day, (e.g., day time or night time), traffic condition (e.g., congested or sparse), attribute of the target object (e.g., model of car, machine capability, etc.), attributes of person in the target object (e.g., with a criminal record, weapon, hostage, etc.), attributes of the area (e.g., population density), the number (density) of pedestrians, to name a few.

In an embodiment, the vehicle behavior determination engine 224 is further configured to determine one or more secondary parameters based on the parameters described above, and determine behavior of the self-driving emergency vehicle system 200 based on values of the secondary parameters. In an embodiment, the secondary parameters include one or more of a probability of capturing (e.g., arrest) the target object thereby, a probability of capturing (e.g., arrest) the target object by the other emergency vehicle systems, a level of danger to the public, and a level of danger to passenger (e.g., hostage) in the target object, to name a few.

In an embodiment, the vehicle behavior determination engine 224 subordinately determines behavior of the self-driving emergency vehicle system 200 based on instructions from an external system (e.g., the self-driving emergency vehicle system 104, the center server 106, and the non-self-driving emergency vehicle system 108 in FIG. 1). In a specific implementation, when the target pointing and tracking engine 222 points to a target object and another self-driving emergency vehicle system has already pointed a target object, the vehicle behavior determination engine 224 determines behavior of the self-driving emergency vehicle system 200 based on an instruction of another self-driving emergency vehicle system that has pointed a target object.

In the example depicted in FIG. 2, the self-driving engine 208 is intended to represent specifically-purposed hardware and software configured to perform a self-driving operation of the self-driving emergency vehicle system 200 based on the determined behavior of the self-driving emergency vehicle system 200. For example, when the vehicle behavior determination engine 224 determines to pursue a target object, the self-driving engine 208 causes the self-driving emergency vehicle system 200 to follow the target object, based on the processed image data (e.g., including the metadata) and the position of the target object. For example, when the vehicle behavior determination engine 224 determines to proceed to a specific location (e.g., a predicted destination of the target object), the self-driving engine 208 causes the self-driving emergency vehicle system 200 to proceed to the specific location. For example, when the vehicle behavior determination engine 224 determines to take a specific route (e.g., parallel to the target object away one block), the self-driving engine 208 causes the self-driving emergency vehicle system 200 to take the specific route.

In the example depicted in FIG. 2, the off-site communication engine 210 is intended to represent specifically-purposed hardware and software configured to carry out off-site communication through a network (e.g., the network 102 in FIG. 1) with network elements (e.g., the self-driving emergency vehicle system 104, the center server 106, the traffic signal system 112 in FIG. 1 or other network element) based on the determined behavior of the self-driving emergency vehicle system 200. For example, when the vehicle behavior determination engine 224 determines to communicate with the other self-driving emergency vehicle systems to instruct a specific operation (e.g., drive to a specific location), the off-site communication engine 210 transmits an instruction through an applicable communication interface using an applicable signal (e.g., radio frequency signals, wireless signals, satellite signals and so on). For example, when the vehicle behavior determination engine 224 determines to communicate with a server (e.g., the center server 106 in FIG. 1) to obtain necessary information (e.g., static information of the target object), the off-site communication engine 210 transmits a request through an applicable communication interface using an applicable signal, in a similar manner to the instruction. For example, when the vehicle behavior determination engine 224 determines to communicate with a traffic signal system (e.g., the traffic signal system 112 in FIG. 1) to instruct specific signal state of signals in the region of the self-driving emergency vehicle system 200, the off-site communication engine 210 transmits a command to the traffic signal system through an applicable communication interface using an applicable signal, in a similar manner to the instruction. For example, when the vehicle behavior determination engine 224 determines to communicate with other network element (e.g., a public network system such as Amber alert system), the off-site communication engine 210 communicates with the other network element.

In the example depicted in FIG. 2, the on-site communication engine 212 is intended to represent specifically-purposed hardware and software configured to carry out on-site communication using output devices (e.g., speaker, display, siren, beacon, and etc.) based on the determined behavior of the self-driving emergency vehicle system 200. For example, when the vehicle behavior determination engine 224 determines to generate an on-site message to the public, the on-site communication engine 212 generates an on-site message to the public through the output devices. For example, when the vehicle behavior determination engine 224 determines to generate an on-site message to on-site officers, the on-site communication engine 212 generates an on-site message to the on-site officers through the output devices, for example, using a code word. For example, when the vehicle behavior determination engine 224 determines to generate an on-site message to the target object (e.g., driver on a target vehicle) to notify that the self-driving emergency vehicle system 200 is following the target object, the on-site communication engine 212 generates an on-site message to the target object through the output devices.

In the example depicted in FIG. 2, the target position predicting engine 226 is intended to represent specifically-purposed hardware and software configured to predict a position of a target object at a specific future point in time. In an embodiment, the target position predicting engine 226 predicts the position of the target object based on past and current movement of the target object. For example, the target position predicting engine 226 predicts the position of the target object based on paths taken by the target object, a speed profile of the target object, locations corresponding to attribute information (e.g., home address, office address, etc.) of the target object, when the self-driving emergency vehicle system 200 has not notified its presence to the target object (or when it is determined the target object has not recognized the self-driving emergency vehicle system 200 based on the movement of the target object).

In an embodiment, the target position predicting engine 226 predicts the position (e.g., by reactive movement) of the target object based the determined behavior of the self-driving emergency vehicle system 200 and contents of the determined off-site and/or on-site communication made by the self-driving emergency vehicle system 200 (, which may correspond to behavior of the other self-driving emergency vehicle systems). For example, the target position predicting engine 226 predicts the position of the target object based on a route of the self-driving emergency vehicle system 200 and a position of the self-driving emergency vehicle system 200 relative to the target object, when the self-driving emergency vehicle system 200 has notified its presence to the target object (or when it is determined the target object has recognized the self-driving emergency vehicle system 200 based on the movement of the target object).

Figure 3:
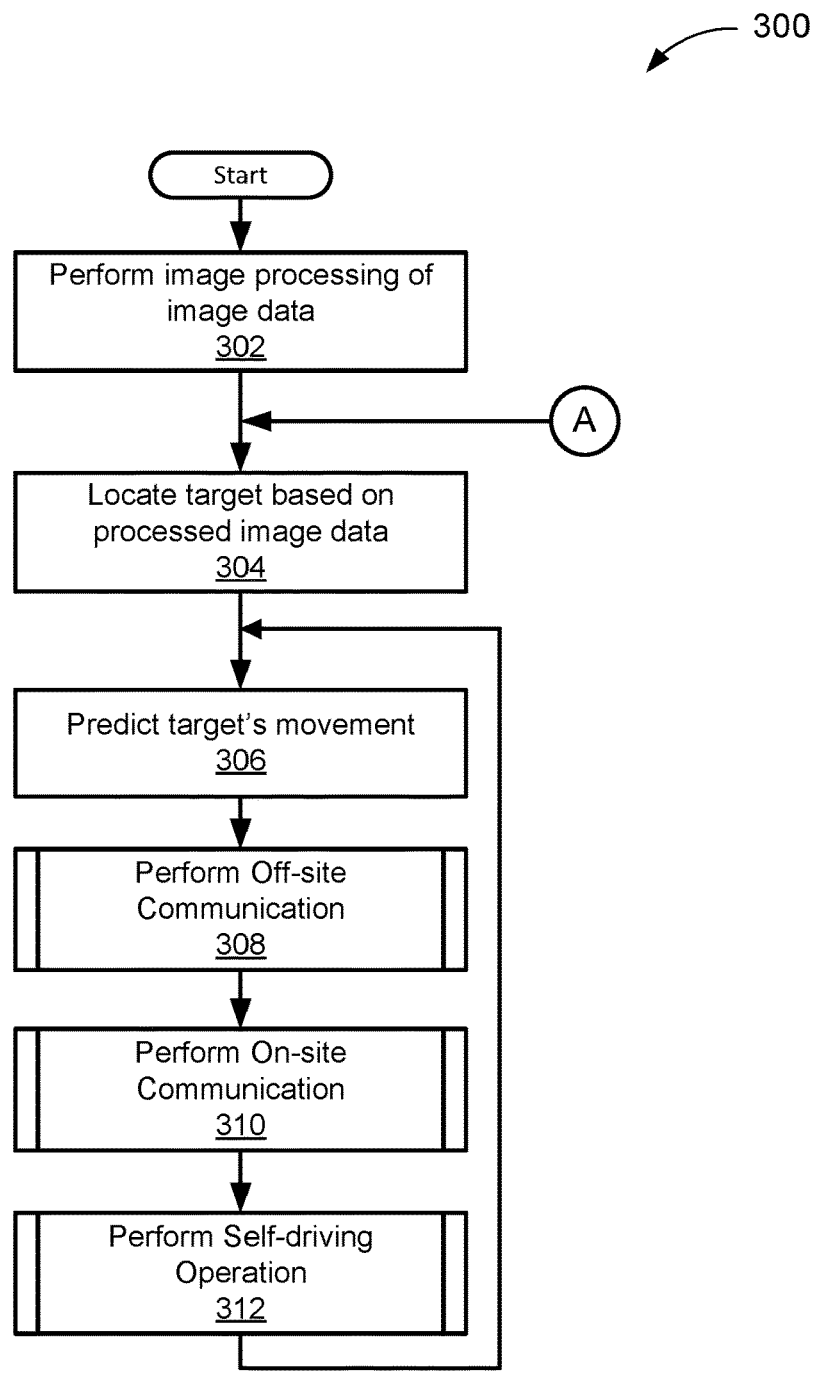
FIG. 3 is a schematic diagram depicting an example of arrangement of different types of focus lenses in a focus-variable lens mount unit according to an embodiment.

FIG. 3 depicts a flowchart 300 of an example of a method for coordinated self-driving of emergency vehicles in terms of a self-driving emergency vehicle system that locates a target object. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. In the example of FIG. 3, the flowchart 300 starts at module 302, with performing image processing of image data. An applicable system for performing image processing, such as the image processing engine described in this paper, can perform the image processing. In an embodiment, objects included in scene images captured by imaging devices are detected, the detected objects are then identified according to an image recognition technique, and relative position and orientation of the detected objects from a self-driving emergency vehicle system are determined in the module 302.

In the example of FIG. 3, the flowchart 300 continues to module 304, with locating a target object based on processed image data. An applicable system for locating a target object, such as the target pointing and tracking engine described in this paper, can locate the target object. In an embodiment, absolute position and orientation of the self-driving emergency vehicle system are determined based on information obtained from sensors (e.g., GPS, a gyro sensor, an acceleration sensor, etc.), and an absolute position and orientation of the target object is determined based on the absolute position and orientation of the self-driving emergency vehicle system and the relative position of the target object.

In the example of FIG. 3, the flowchart 300 continues to module 306, with predicting movement of the target object. An applicable system for predicting movement of a target object, such as the target position predicting engine described in this paper, can predict movement of the target object. In an embodiment, movement of the target object before the self-driving emergency vehicle system is perceived by the target object is predicted in an initial sequence, and reactive movement of the target object after the self-driving emergency vehicle system has been perceived by the target object is predicted in a subsequent sequence in a loop, after performing module 312.

In the example of FIG. 3, the flowchart 300 continues to module 308, with performing off-site communication. An applicable system for performing off-site communication, such as the off-site communication engine described in this paper, can perform the off-site communication. In an embodiment, the off-site communication includes communication with one or more of the other self-driving emergency vehicle systems (e.g., the self-driving emergency vehicle system 104 in FIG. 1), an external server (e.g., the center server 106 in FIG. 1), a traffic signal system (e.g., the traffic signal system 112 in FIG. 1).

In the example of FIG. 3, the flowchart 300 continues to module 310, with performing on-site communication. An applicable system for performing on-site communication, such as the on-site communication engine described in this paper, can perform the on-site communication. In an embodiment, the on-site communication includes communication with one or more of the target object, the public, and on-site officers (e.g., on-site police officers).

In the example of FIG. 3, the flowchart 300 continues to module 312, with performing a self-driving operation. An applicable system for performing a self-driving operation, such as the self-driving control engine described in this paper, can perform the self-driving operation. In an embodiment, the self-driving operation include one or more of pursuing the target object, proceeding to a specific location (e.g., predicted location of the target object) not pursuing the target object, taking a specific route, and staying at the current location. In the example of FIG. 3, the flowchart 300 returns to module 306, and module 306 through module 312 are repeated.

Figure 4:
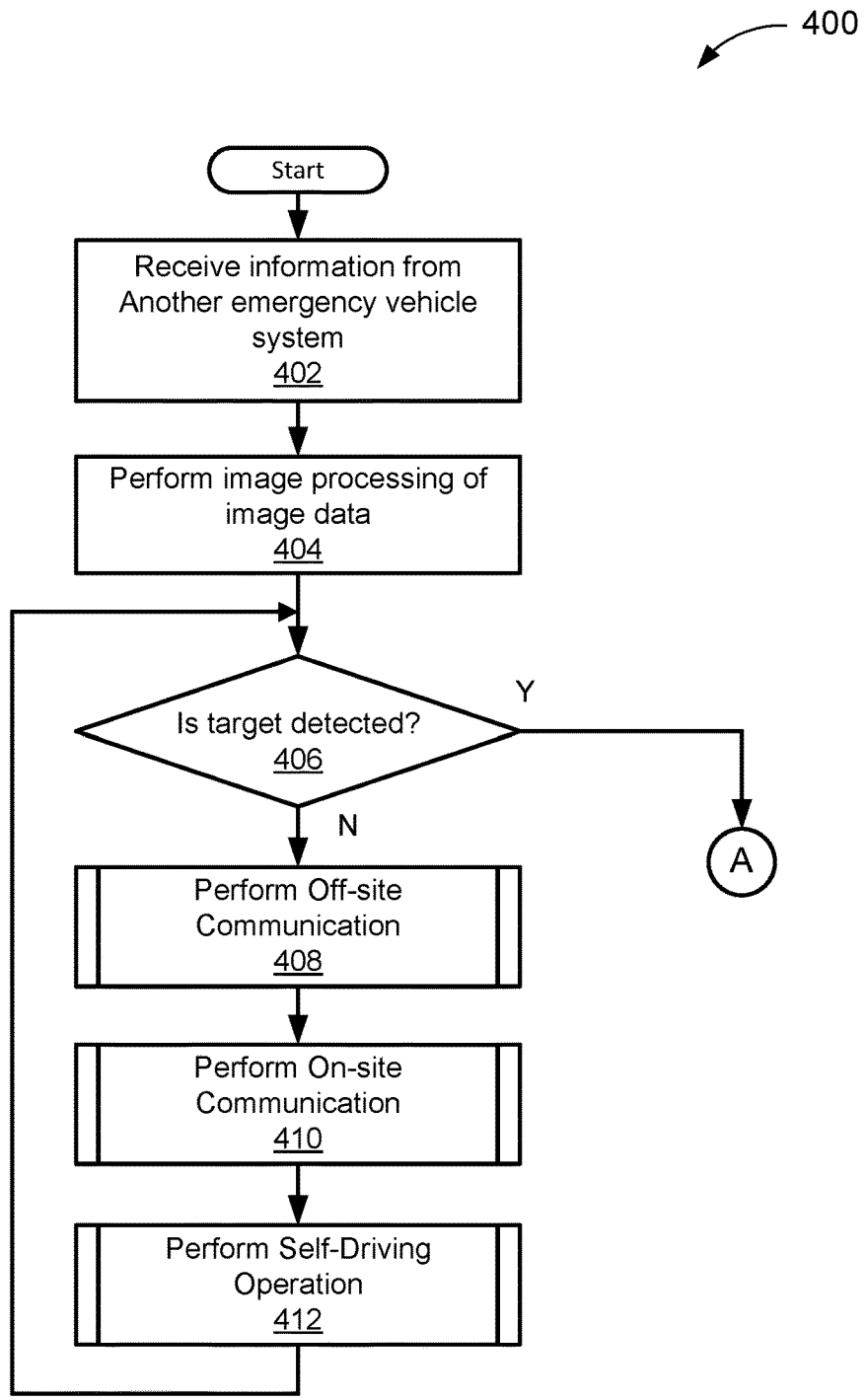
FIG. 4 depicts a flowchart of an example of a method for coordinated self-driving of emergency vehicles in terms of a self-driving emergency vehicle system that has not detected a target object.

FIG. 4 depicts a flowchart 400 of an example of a method for coordinated self-driving of emergency vehicles in terms of a self-driving emergency vehicle system that has not detected a target object (i.e., off-site). In the example of FIG. 4, the flowchart 400 starts at module 402, with receiving information from another self-driving emergency vehicle system that is on-site and has located a target object. An applicable system for performing receiving information, such as the off-site communication engine described in this paper, can receive the information from another self-driving emergency vehicle system. In an embodiment, the information received from another self-driving emergency vehicle system includes one or more of a current location of the target object, a predicted location of the target object, a current location of said another self-driving emergency vehicle system, a route to be taken by said another self-driving emergency vehicle system. In the embodiment, the information includes one or more of an instruction to proceed to a specific location, an instruction to take a specific route, and an instruction to stay at the current location.

In the example of FIG. 4, the flowchart 400 continues to module 404, with performing image processing of image data. An applicable system for performing image processing, such as the image processing engine described in this paper, can perform the image processing. In an embodiment, the image processing in module 404 is carried out in a manner similar to module 302 in the flowchart 300.

In the example of FIG. 4, the flowchart 400 continues to decision point 406, with determining whether a target object, which is notified from another self-driving emergency vehicle system, is detected through the image processing performed in module 404. An applicable system for determining whether a target object is detected, such as the target pointing and tracking engine described in this paper, can perform the determination.

If a decision result of the decision point 406 is Yes (Y in FIG. 4), the flowchart 400 proceeds to the module 304 in the flowchart 300. If the decision result of the decision point 406 is No (N in FIG. 4), the flowchart 400 proceeds to the module 408, with performing off-site communication in a similar manner to the off-site communication performed in the module 308. In an embodiment, the off-site communication includes communication of a current location and a route to be taken thereby to one or more of the other self-driving emergency vehicle systems (e.g., the self-driving emergency vehicle system 104 in FIG. 1). In an embodiment, the off-site communication includes communication to control traffic signal ahead thereof with a traffic signal system (e.g., the traffic signal system 112 in FIG. 1). In an embodiment, the off-site communication includes communication to obtain information of a target object from an external server (e.g., the center server 106 in FIG. 1).

In the example of FIG. 4, the flowchart 400 continues to decision point 410, with performing on-site communication in a similar manner to the off-site communication performed in the module 310. In an embodiment, the on-site communication includes communication with the public.

In the example of FIG. 4, the flowchart 400 continues to decision point 412, with performing a self-driving operation in a similar manner to the off-site communication performed in the module 312. In an embodiment, the self-driving operation include one or more of proceeding to a specific location (e.g., predicted location of the target object), taking a specific route, and staying at the current location. In the example of FIG. 3, the flowchart 400 returns to module 406, and module 406 through module 412 are repeated until a target object is detected.

Figure 5:
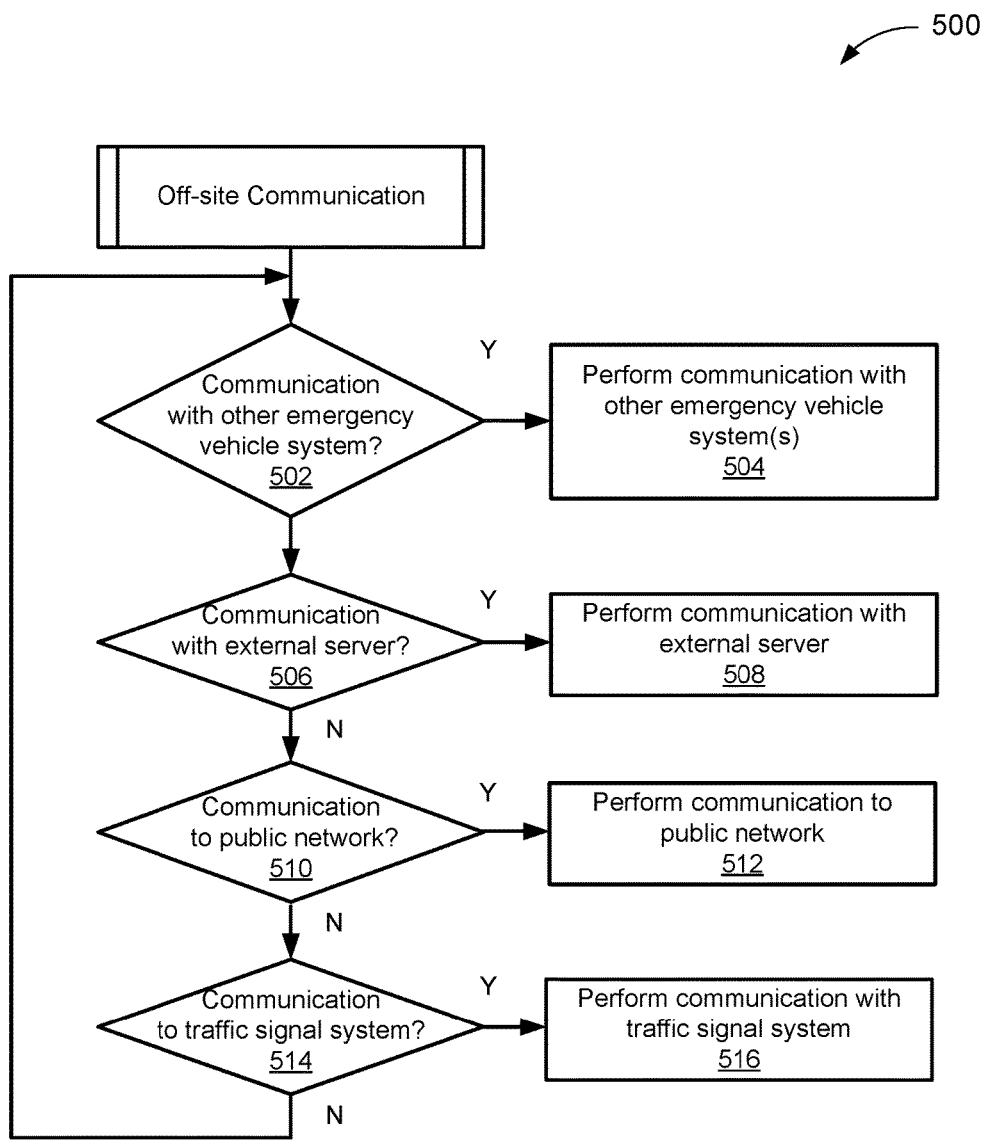
FIG. 5 depicts a flowchart of an example of a method for off-site communication.

FIG. 5 depicts a flowchart 500 of an example of a method for off-site communication. In an embodiment, the off-site communication includes one or both of the off-site communication in the module 308 in FIG. 3 and the off-site communication in the module 408 in FIG. 4. A sequence of the flowchart 500 is carried out with respect to each instance of off-site communication. In the example of FIG. 5, the flowchart 500 starts at decision point 502, with determining whether a specific instance of off-site communication is communication to one or more other self-driving emergency vehicle systems (e.g., the self-driving emergency vehicle systems 104 in FIG. 1). If a decision result of the decision point 502 is Yes (Y in FIG. 5), the flowchart 500 continues to module 504, with performing communication with one or more other self-driving emergency vehicle systems. In an embodiment, the communication to one or more other self-driving emergency vehicle systems includes sending/ receiving information of a target object and information of the own/other self-driving emergency vehicle system. In an embodiment, the communication to one or more other self-driving emergency vehicle systems includes sending/receiving instruction to proceed to a specific location, take a specific route, and stay at the current location.

In the example of FIG. 5, if the decision result of the decision point 502 is No (N in FIG. 5), the flowchart 500 continues to decision point 506, with determining whether the specific instance of the off-site communication is communication to an external server (e.g., the center server 106 in FIG. 1). If a decision result of the decision point 506 is Yes (Y in FIG. 5), the flowchart 500 continues to module 508, with performing communication with an external server. In an embodiment, the communication with an external server includes sending/receiving information of a target object and information of the own/other self-driving emergency vehicle system.

In the example of FIG. 5, if the decision result of the decision point 506 is No (N in FIG. 5), the flowchart 500 continues to decision point 510, with determining whether the specific instance of the off-site communication is communication to the public (e.g., a public communication network). If a decision result of the decision point 510 is Yes (Y in FIG. 5), the flowchart 500 continues to module 512, with performing communication to the public. In an embodiment, the communication to the public includes sending information of a target object (e.g., a runway of a runway vehicle). In an example, the public communication network may be a communication network substantially similar to Amber alert system. In an embodiment, the communication to the public may be via the external server (e.g., the center server 106).

In the example of FIG. 5, if the decision result of the decision point 510 is No (N in FIG. 5), the flowchart 500 continues to decision point 514, with determining whether the specific instance of the off-site communication is communication to a traffic signal system (e.g., the traffic signal system 112 in FIG. 1). If a decision result of the decision point 514 is Yes (Y in FIG. 5), the flowchart 500 continues to module 516, with performing communication to the traffic signal system. In an embodiment, the communication to the traffic signal system includes sending a control signal to the traffic signal system so as to control states (e.g., green or red) of one or more specific traffic signals. If a decision result of the decision point 514 is No (N in FIG. 5), the flowchart 500 returns to the decision pint 502 for a next instance of off-site communication.

Figure 6:
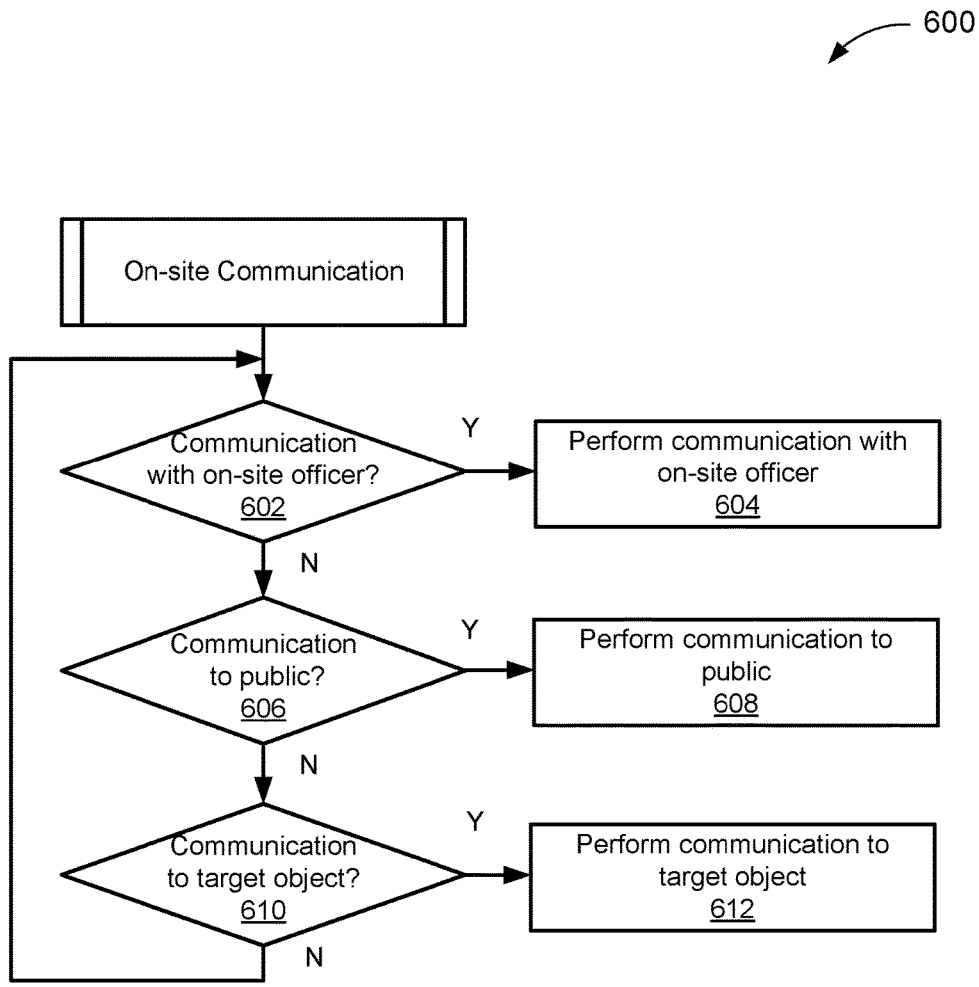
FIG. 6 depicts a flowchart of an example of a method for on-site communication.

FIG. 6 depicts a flowchart 600 of an example of a method for on-site communication. In an embodiment, the on-site communication includes one or both of the on-site communication in the module 308 in FIG. 3 and the off-site communication in the module 408 in FIG. 4. That is, the on-site communication in FIG. 6 is intended to represent local communication where a self-driving emergency vehicle system is located. A sequence of the flowchart 600 is carried out with respect to each instance of on-site communication. In the example of FIG. 6, the flowchart 600 starts at decision point 602, with determining whether a specific instance of on-site communication is communication to on-site officer(s).

If a decision result of the decision point 602 is Yes (Y in FIG. 5), the flowchart 600 continues to module 604, with performing communication with on-site officer(s). In an embodiment, the communication to the on-site officer(s) includes sending/receiving information of a target object and information of the own/other self-driving emergency vehicle system through a radio frequency signal. In an embodiment, the communication to the on-site officer(s) includes generating an audio (voice) message through a speaker and/or presenting a visual message through a display. In a more specific implementation, the audio (voice) message and/or the visual message includes a code word regarding the target object (e.g., attribute information of the target object).

In the example of FIG. 6, if the decision result of the decision point 602 is No (N in FIG. 6), the flowchart 600 continues to decision point 606, with determining whether the specific instance of the on-site communication is communication to the public on-site. If a decision result of the decision point 606 is Yes (Y in FIG. 6), the flowchart 600 continues to module 608, with performing communication to the public. In an embodiment, the communication to the public includes generating an audio (voice) message through a speaker and/or presenting a visual message through a display. In a more specific implementation, the audio (voice) message and/or the visual message includes an evacuation order to the public on-site.

In the example of FIG. 6, if a decision result of the decision point 606 is No (N in FIG. 6), the flowchart 600 continues to module 612, with performing communication to the target object. In an embodiment, the communication to the target object includes generating an audio (voice) message through a speaker and/or presenting a visual sign or message. In a more specific implementation, the visual signal includes activation of a siren, the audio (voice) message includes an order to pull over to a curb side, a warning of attack by the self-driving emergency vehicle system, and so on. If a decision result of the decision point 610 is No (N in FIG. 6), the flowchart 600 returns to the decision pint 602 for a next instance of on-site communication.

Figure 7:
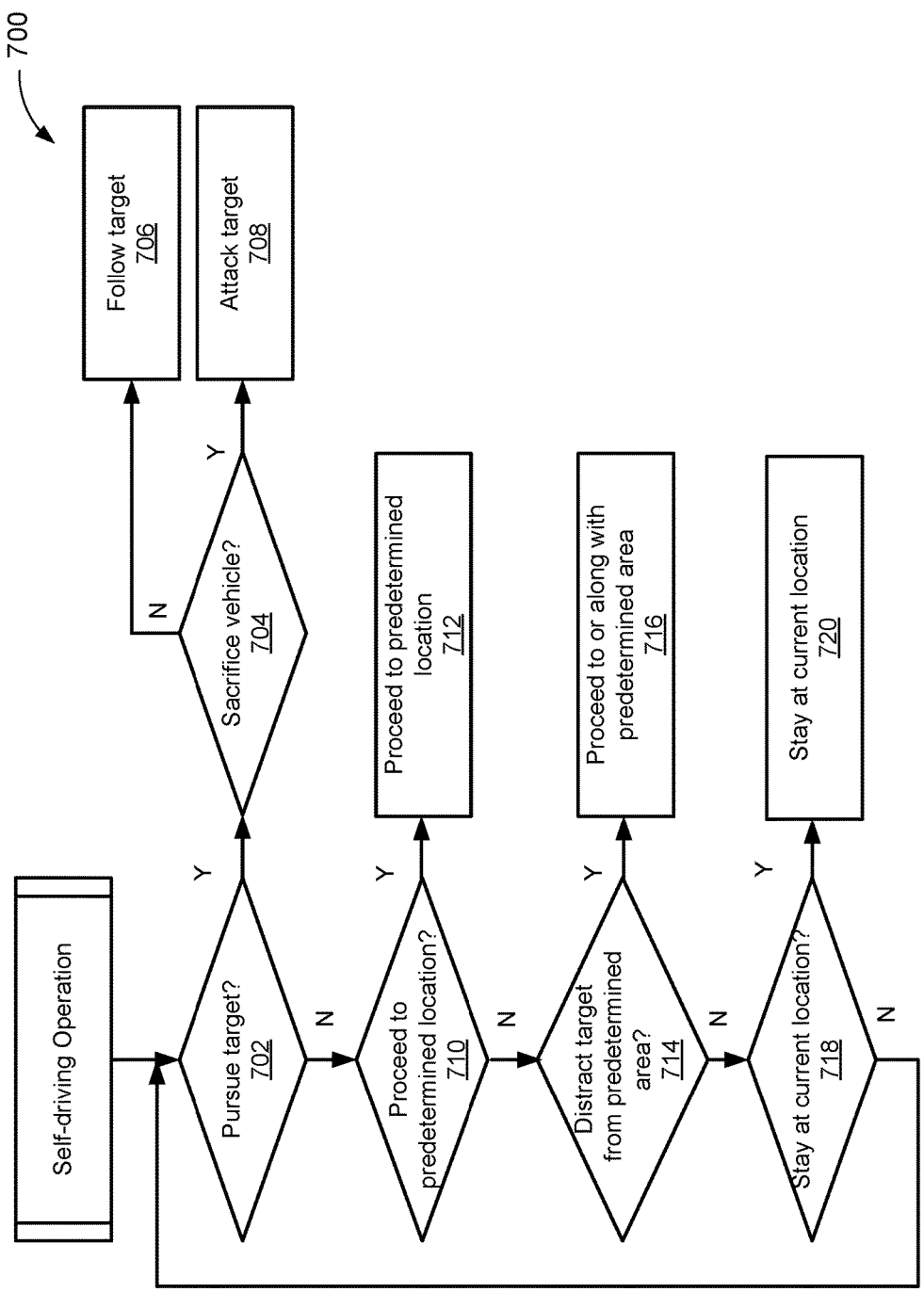
FIG. 7 depicts a flowchart of an example of a method for a self-driving operation.

FIG. 7 depicts a flowchart 700 of an example of a method for a self-driving operation. In an embodiment, the self-driving operation includes one or both of the self-driving operation in the module 312 in FIG. 3 and the self-driving operation in the module 412 in FIG. 4. A sequence of the flowchart 700 is carried out with respect to each instance of off-site communication. In the example of FIG. 7, the flowchart 700 starts at decision point 702, with determining whether a specific instance of self-driving operation is pursuing a target object. If a decision result of the decision point 702 is Yes (Y in FIG. 7), the flowchart 700 continues to decision point 704, with determining whether a self-driving emergency vehicle system is sacrificed. In an embodiment, the decision to sacrifice the self-driving emergency vehicle system is made based on comparison of danger to the public (or to passengers) if the target object continues to run with danger to the public (or to passengers) if the target object is forcibly stopped.

In the example of FIG. 7, if a decision result of the decision point 704 is No (N in FIG. 7), the flowchart 700 continues to module 706, with following the target object. In an embodiment, the following of the target object includes self-driving of the self-driving emergency vehicle system at least with a predetermined distance from the target object, so as not to cause a dangerous run by the target object. In an embodiment, the following of the target object includes self-driving violating regular traffic rules to secure safety against the target object. In an embodiment, the following of the target object includes proceeding ahead of a non-self-driving emergency vehicle system (i.e., the non-self-driving emergency vehicle system 108 in FIG. 1) that also pursues the target object, so as to protect passengers in the non-self-driving emergency vehicle system from danger.

In the example of FIG. 7, if a decision result of the decision point 704 is Yes (Y in FIG. 7), the flowchart 700 continues to module 708, with attacking the target object sacrificing the self-driving emergency vehicle system. In an embodiment, the attack is performed at timing and place that are likely to cause minimum injury to people (including passengers in the target object).

In the example of FIG. 7, if a decision result of the decision point 702 is No (N in FIG. 7), the flowchart 700 continues to decision point 710, with determining whether the self-driving emergency vehicle system proceeds to a predetermined location, without following the target object. If a decision result of the decision point 710 is Yes (Y in FIG. 7), the flowchart 700 continues to decision point 712, with proceeding to the predetermined location. In an embodiment, the predetermined location is a predicted location of the target object at a future point of time.

In the example of FIG. 7, if a decision result of the decision point 710 is No (N in FIG. 7), the flowchart 700 continues to decision point 714, with determining whether the self-driving emergency vehicle system distracts a target object away from a predetermined area. In an embodiment, the decision to distract the target object is made based on comparison of danger to the public (or passengers) if the target object comes to a predetermined area (e.g., high populated area, school zone, a facility handling dangerous materials, such as gasoline) with danger to the public (or passengers) if the target object moves away from the predetermined area.

In the example of FIG. 7, if a decision result of the decision point 714 is Yes (Y in FIG. 7), the flowchart 700 continues to module 716, with proceeding to or along with the predetermined area, such that the target object is destructed away from the predetermined area and that the self-driving emergency vehicle system can protect the predetermined area if the target object comes towards the predetermined area nevertheless. In an embodiment, the proceeding to the predetermined area may cause on-site communication such as activating a siren and generating an alert message to the public to evacuate, which is, for example, carried out in module 608 in FIG. 6.

In the example of FIG. 7, if a decision result of the decision point 714 is No (N in FIG. 7), the flowchart 700 continues to decision point 718, with determining whether the self-driving emergency vehicle system stays at the current location. In an embodiment, the decision to stay at the current location is made based on comparison of the current location of the self-driving emergency vehicle system and the predicted location of the target object. For example, if the predicted location of the target object is at the current location of the self-driving emergency vehicle system, a decision to stay at the current location is made. In an embodiment, the decision to stay at the current location is made based on comparison of the current location of the self-driving emergency vehicle system and the above-described predetermined area to be protected. For example, if predetermined area to be protected is at the current location of the self-driving emergency vehicle system, a decision to stay at the current location is made. In another embodiment, the decision to stay at the current location is made based on necessity to regulate traffic at the current location. For example, if there is necessity to restrict traffic towards the target object at the current location, a decision to stay at the current location is made.

In the example of FIG. 7, if a decision result of the decision point 718 is Yes (Y in FIG. 7), the flowchart 700 continues to module 720, with staying at the current location of the self-driving emergency vehicle system. If the decision result of the decision point 718 is No (N in FIG. 7), the flowchart 700 returns to module 702.

Figure 8:
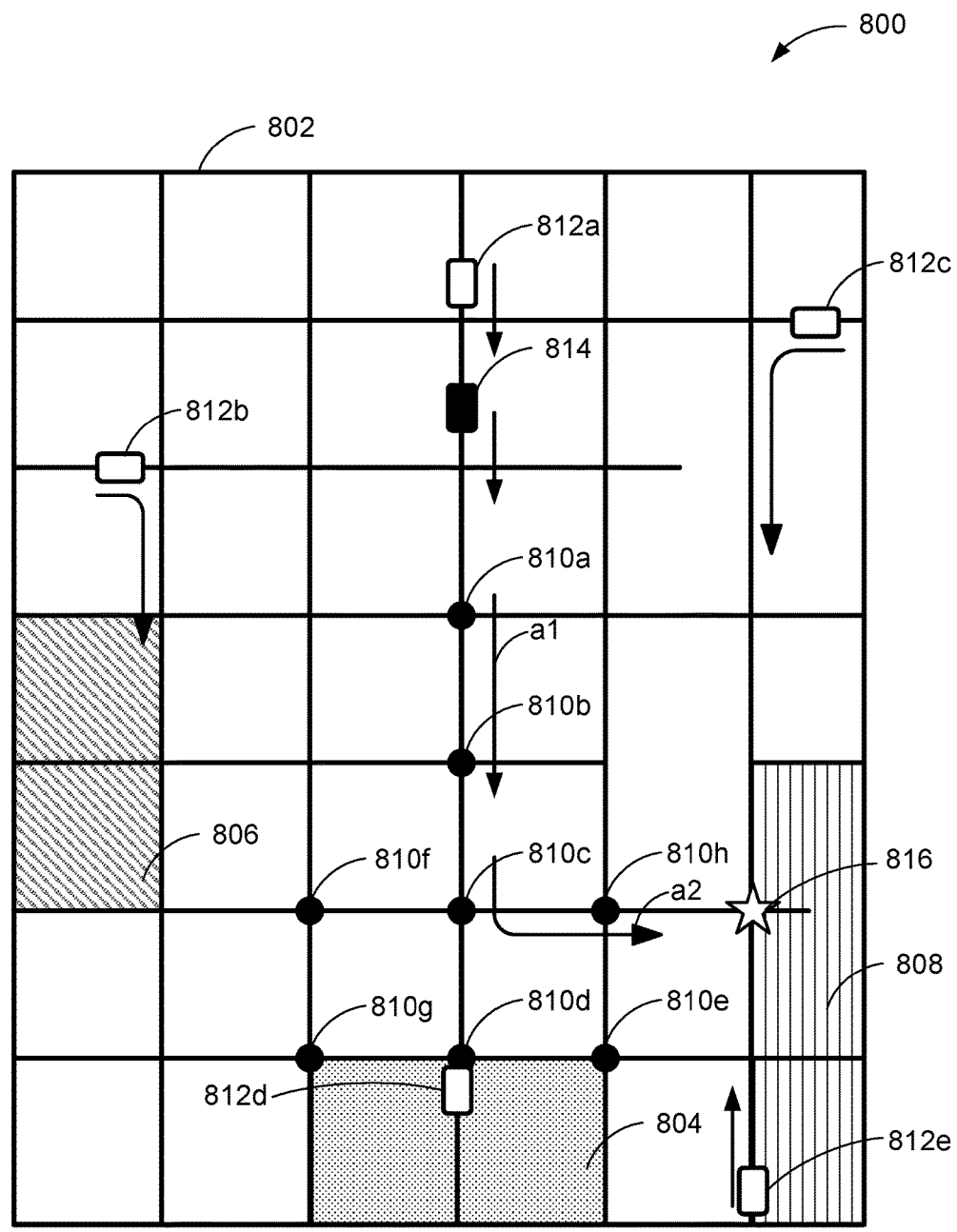
FIG. 8 is a schematic map diagram of an example of deployment and behavior of a plurality of self-driving emergency vehicle systems in an exemplary occasion.

FIG. 8 is a schematic map diagram 800 of an example of deployment and behavior of a plurality of self-driving emergency vehicle systems in an exemplary occasion. In the example depicted in FIG. 8, the schematic map diagram 800 depicts a map of a hypothetical region, which includes roads 802 that are generally structured in a grid pattern, a high populated area (e.g., shopping avenue) 804, a school zone 806, and a less populated area (e.g., empty lot) 808. The region further includes traffic signals 810a-810h. In the region, five self-driving emergency vehicle systems 812a-812e are deployed to capture a target vehicle 814.

In the example of FIG. 8, the self-driving emergency vehicle systems 812a has pointed the target vehicle 814 as a target object because the target vehicle 814 is recognized as passing a red signal and proceeding over a speed limit according to image processing of scene images received by the self-driving emergency vehicle systems 812a.

The self-driving emergency vehicle systems 812a is now carrying out a self-driving operation to pursue the target vehicle 814 to capture target vehicle 814 and carrying out an on-site communication to the target vehicle 814 with a siren sound and an order (voice message) to pull over to a curb side. Based on the speed of the target vehicle 814 and sparse traffic, the self-driving emergency vehicle systems 812a predicts that the target vehicle 814 goes straight at least two to three more blocks as long as the traffic signals 810a, 810b, and 810c are all green.

To guide the target vehicle 814 to an intended route, the self-driving emergency vehicle systems 812a carries out off-site communication to communicate with a traffic signal system and cause the traffic signals 810a and 810b to be green (in a vertical direction in FIG. 8), such that the target vehicle 814 can go straight in a direction indicated by an arrow a1. Further, the self-driving emergency vehicle systems 812a carries out off-site communication to cause the traffic signal 810c to be left-turn green, such that the target vehicle 814 does not proceed to the high populated area 804 and instead proceed to the less populated area 808. Then, the self-driving emergency vehicle systems 812a carries out off-site communication to cause the traffic signal 810h to be green (in a horizonal direction in FIG. 8), such that the target vehicle 814 is tempted to proceed to a point 816, which is a predicted location of the target vehicle 814. In addition, the self-driving emergency vehicle systems 812a carries out off-site communication to cause the traffic signals 810d, 810e, 810g, 810f to be all red (both horizontal and vertical directions in FIG. 8) to freeze the traffic.

In an specific implementation, the self-driving emergency vehicle systems 812a also carries out off-site communication to communicate with the self-driving emergency vehicle systems 812b-812e to notify the incident regarding the target vehicle 814 and request assistance. Specifically, the self-driving emergency vehicle systems 812a notifies its route (i.e., through the traffic signals 810a, 810b, 810c, and 810h) to the self-driving emergency vehicle systems 812c and 812e and instructs the self-driving emergency vehicle systems 812c and 812e to proceed to the point 816 so as to block all paths from the point 816. Further, the self-driving emergency vehicle systems 812a instructs the self-driving emergency vehicle system 812b to proceed along with the school zone 806 for protecting the school zone 806 from the target vehicle 814, and to notify danger of the target vehicle 814 to people around the school zone 806. Moreover, the self-driving emergency vehicle systems 812a instructs the self-driving emergency vehicle system 812d to stay at its current location for protecting the high populated area 804 and to notify danger of the target vehicle 814 to people around the high populated area 804.

In another specific implementation, the self-driving emergency vehicle systems 812a also carries out off-site communication to communicate with the self-driving emergency vehicle systems 812b-812e to notify the incident regarding the target vehicle 814 and a predicted path of the target vehicle 814. The self-driving emergency vehicle systems 812b-812e determine deployed positions of the self-driving emergency vehicle systems 812a-812e, and autonomously determines each own operation to handle the incident.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
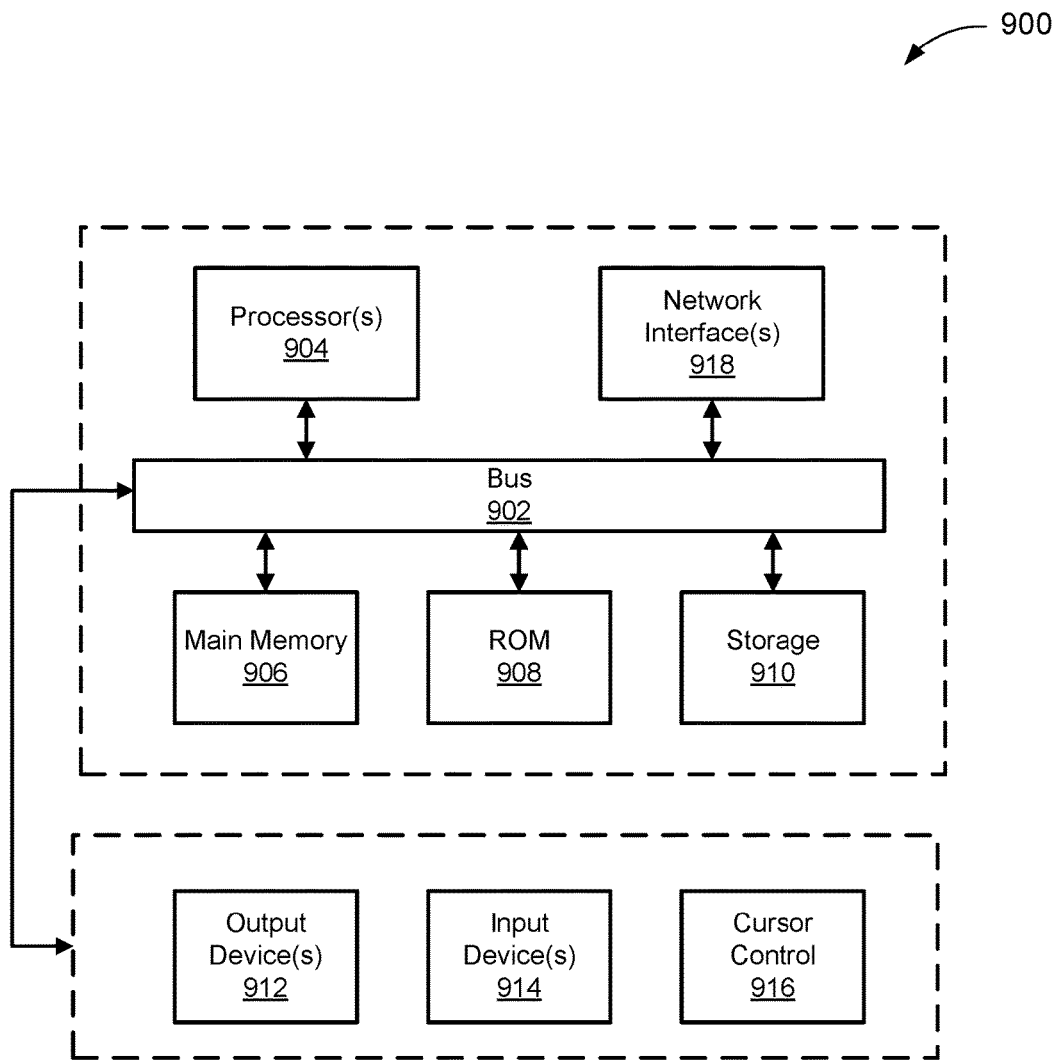
FIG. 9 is a block diagram that illustrates a computer system upon which any of the embodiments described herein may be implemented.

FIG. 9 is a block diagram that illustrates a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to output device(s) 912, such as a cathode ray tube (CRT) or LCD display (or touch screen), for displaying information to a computer user. Input device(s) 914, including alphanumeric and other keys, are coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system included in a self-driving vehicle of a plurality of self-driving vehicles that are connected through a network, comprising:
   one or more processors; and
   a memory storing instructions that, when executed by the one or more processors, cause the system to perform;

processing image data of one or more scene images received by the self-driving vehicle, to detect one or more objects included in the one or more scene images;

determining a target object from the one or more detected objects at least based on the processed image data;

predicting movement of the target object at least based on a current position and a current movement state of the target object;

performing a self-driving operation to drive the self-driving vehicle based on the predicted movement of the target object; and determining whether to sacrifice the self-driving vehicle based on a comparison of a danger to others if the target object continues to run and a danger to others if the target object is forcibly stopped.

2. The system of claim 1, wherein said determining the target object comprises:

receiving a feature of the target object from an external source that is external to said one of the plurality of self-driving vehicles; and comparing the received feature of the target object with a corresponding feature of one or more of the detected objects that are obtained from the processed image data.

3. The system of claim 1, wherein said determining the target object comprises:

determining whether or not movement of a selected one of the detected objects does not match a predetermined standard; and upon determining that the movement of the selected one of the detected objects does not match the predetermined standard, determining the selected one of the detected objects as the target object.

4. The system of claim 1, wherein the current movement state of the target object includes a direction of movement of the target object, an orientation of the target object, and a speed of the movement of the target object.

5. The system of claim 1, wherein the system is caused to further perform communication with another one of the plurality of self-driving vehicles through the network, based on the predicted movement of the target object.

6. The system of claim 5, wherein the communication includes sending an instruction to take a designated route to said another one of the plurality of self-driving vehicles.

7. The system of claim 1, the system is caused to further perform communication with a traffic signal system to cause one or more traffic signals to be at a designated state.

8. The system of claim 7, wherein, the performing communication with the traffic signal system comprises, in response to the system sending a command to the traffic signal system that contradicts a command from another source, determining the designated state of the traffic signal on a first-come-first-serve basis.

9. The system of claim 7, wherein the system is caused to further perform:

determining whether the target object recognizes the system; and predicting a position of the target object in response to determining that the target object recognizes the system.

10. The system of claim 7, wherein the performing the self-driving operation comprises proceeding ahead of a non-self-driving emergency vehicle system while pursuing the target object.

11. The system of claim 1, the system is caused to further perform generating an on-site notification from said one of the plurality of self-driving vehicles, based on the predicted movement of the target object.

12. The system of claim 1, the system is caused to further perform updating the predicted movement of the target object, based on the self-driving operation that has been performed.

13. The system of claim 1, wherein the system is further caused to, in response to determining to sacrifice the self-driving vehicle, select a time and a place of the self-driving operation that minimizes an injury to a passenger in the target object.

14. The system of claim 1, wherein the determining whether to sacrifice the self-driving vehicle is based on a probability of capturing the target object, and a probability of capturing the target object by another of the self-driving vehicles.

15. The system of claim 1, wherein the system is caused to further receive, from a server, information of a crime history of the target object, whether or not the target object is carrying a weapon, and whether or not the target object is with a hostage.

16. A computer-implemented method performed in one of a plurality of self-driving vehicles that are connected through a network, the method comprising:

processing image data of one or more scene images received by said one of the plurality of self-driving vehicles, to detect one or more objects included in the one or more scene images;

determining a target object from the one or more detected objects at least based on the processed image data;

predicting movement of the target object at least based on a current position and a current movement state of the target object; and performing a self-driving operation to drive said one of the plurality of self-driving vehicles based on the predicted movement of the target object; and determining whether to sacrifice the self-driving vehicle based on a comparison of a danger to others if the target object continues to run and a danger to others if the target object is forcibly stopped.

17. The computer-implemented method of claim 16, wherein said determining the target object comprises:

receiving a feature of the target object from an external source that is external to said one of the plurality of self-driving vehicles; and comparing the received feature of the target object with a corresponding feature of one or more of the detected objects that are obtained from the processed image data.

18. The computer-implemented method of claim 16, further comprising performing communication with another one of the plurality of self-driving vehicles through the network, based on the predicted movement of the target object.

19. The computer-implemented method of claim 16, further comprising communicating with a traffic signal system to cause one or more traffic signals to be at a designated state.

20. The computer-implemented method of claim 16, further comprising updating the predicted movement of the target object, based on the self-driving operation that has been performed.

* * * * *